(No Model.)
F. WILEY.
CHURN.
No. 490,730.          Patented Jan. 31, 1893.
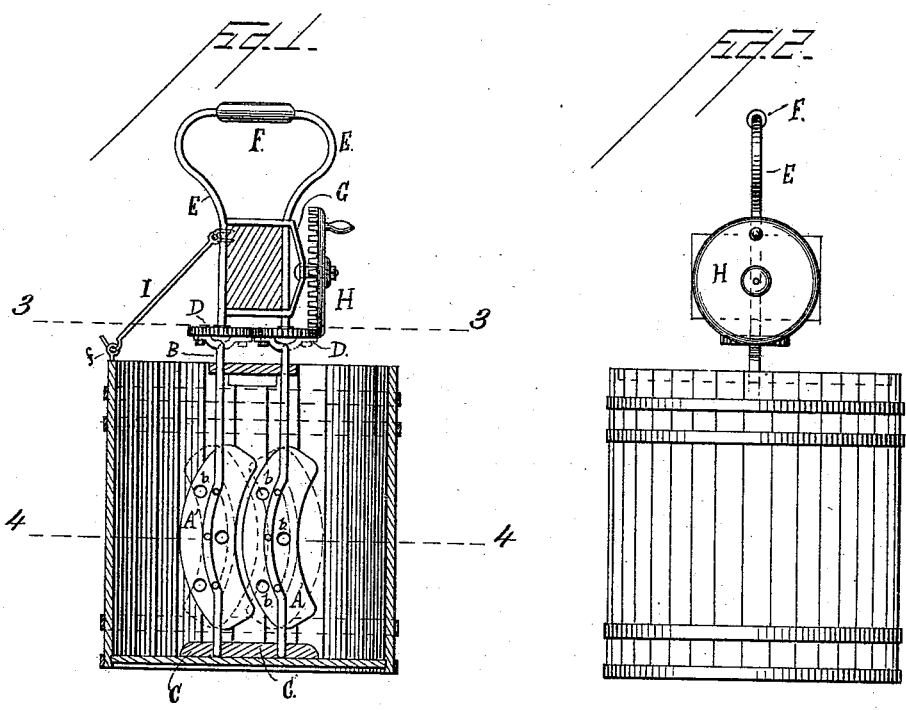
Attest:
F. H. Schott
J. H. Wiles
Inventor
Frederick Wiley
By Wm A Bell & Co.
Attorneys

UNITED STATES PATENT OFFICE.

FREDERICK WILEY, OF AVOCA, IOWA.

CHURN.

SPECIFICATION forming part of Letters Patent No. 490,730, dated January 31, 1893.

Application filed March 26, 1892. Serial No. 426,487. (No model.)

*To all whom it may concern:*

Be it known that I, FREDERICK WILEY, a citizen of the United States, residing at Avoca, in the county of Pottawattamie and State of Iowa, have invented certain new and useful Improvements in Churns; and I do hereby declare the following to be a full, clear, and exact description of the invention, such as will enable others skilled in the art to which it appertains to make and use the same.

The object of my invention is to provide an improvement in a churn that can be readily taken apart and put in the vessel again for the purpose of cleansing and airing all its parts, thus making a useful and cheap article for the household.

Like letters of reference in the drawings represent corresponding parts in all the different figures.

In the accompanying drawings;—Figure 1. is a side elevation of the device complete. Fig. 2. is a side view. Fig. 3. is a top view of the cogs to dashers. Fig. 4. is a bottom view.

A. is a tub or suitable vessel of any suitable size or shape.

A' are two dashers preferably made quarter moon shaped, and so adjusted that they set in the position shown in Fig. 1. and when turning describe a like circle to each other.

b. are perforations usually three in number on each dasher, but a greater or less number can be made.

B. are two rods, the lower half of which are bent to a quarter or half circle, to which the dashers A' are attached by the rivets c.

C. is a base piece secured to the inside of the bottom of the vessel A.

D. are two cogs meshing into each other. The lower ends or extremities of the rods B. are set into receptacles made to receive them in the base piece C. and the upper ends of the rods B. are bent at a right angle and riveted to the lower side of the cogs D.

E. is a rod bent to form a handle F. both ends or extremities of which have a head and form an axle to the cogs D. The middle of the rod E. forms a loop or handle F. to the churning device. G. is a frame or brace.

H. is a crank wheel pivoted on the outside of the brace G. and provided with cogs which mesh into one of the cogs D.

I. are hook braces secured to the upper part of my device and hooked in eyes *f*. on the edge of the vessel. There are preferably three hooked braces used with the device.

L. is a square piece of wood, forming a filling set in the space of the brace G. and rods F. and is for the purpose of strengthening the same. It can thus be seen that when using my device; by placing one hand on the handle F. to steady it, and the other to the handle on the crank wheel H. and turning the same the dashers are caused to rotate and do the churning.

When it is necessary to take the device apart for the purpose of cleaning the same, the hook rods are disengaged from the eyes on the edge of the vessel and the device can be lifted out.

Having thus described my invention, what I claim as new and desire to secure by Letters Patent, is,—

1. In a churn the combination with a suitable vessel, of the base piece C, fixed to said vessel, the vertical rods B journaled in said vessel and curved laterally, the perforated crescent-shaped dashers A, fixed to the curved portions of the rods, the inter-meshing gear wheels mounted on the upper ends of said rods, the crank wheel H, the brace G, on which said crank wheel is mounted, said crank wheel meshing with one of said gear wheels, and the hooked braces I, detachably connecting the vessel with the churn mechanism, substantially as set forth.

2. In a churn the combination with a suitable vessel and manually operated gear mechanism, of vertical rods curved laterally at their lower portions, which rods are journaled in said vessel and connected with said mechanism, perforated crescent-shaped dashers fixed to the curved portions of the said rods, and detachable hooked braces adapted to connect the said mechanism to the vessel, as and for the purposes set forth.

In testimony whereof I affix my signature in presence of two witnesses.

FREDERICK WILEY.

Witnesses:
WM. A. BELL,
W. S. ASBURY.